US005131269A

United States Patent [19]

Blosnick et al.

[11] Patent Number: 5,131,269

[45] Date of Patent: Jul. 21, 1992

[54] CLAMP FOR RAILROAD CAR COUPLER

[75] Inventors: Robert H. Blosnick, Imperial; James M. Toms, East Pittsburgh, both of Pa.

[73] Assignee: Union Switch & Signal Inc., Pittsburgh, Pa.

[21] Appl. No.: 593,778

[22] Filed: Mar. 27, 1984

[51] Int. Cl.[5] .......... G01L 5/28

[52] U.S. Cl. .......... 73/129; 248/53; 248/231.5

[58] Field of Search .......... 248/231.5, 228, 552, 248/534, 551, 553, 529, DIG. 11, 406.1, 406.2, 53; 269/239, 244, 188; 411/116, 119, 120; 70/19, 212, 229; 73/129; 213/75 R, 76, 77

[56] References Cited

U.S. PATENT DOCUMENTS

| | | | |
|---|---|---|---|
| 58,991 | 5/1897 | Homan | 248/DIG. 11 X |
| 1,132,486 | 3/1915 | Oster | 70/19 X |
| 1,322,434 | 11/1900 | Haskell | 411/116 |
| 1,611,637 | 12/1926 | Ellis | 411/120 |
| 1,801,977 | 4/1931 | Petersen | 70/229 X |
| 1,803,931 | 5/1931 | Blackmore | 70/19 X |
| 2,025,004 | 12/1935 | Shearer | 411/119 X |
| 2,144,837 | 1/1939 | Douglas | 70/19 |
| 2,526,238 | 10/1950 | Kendall | 70/230 |
| 2,602,349 | 7/1952 | Manning | 70/212 X |
| 2,705,603 | 4/1955 | Bitz et al. | 248/534 X |
| 2,869,812 | 1/1959 | Hamel | 248/534 X |
| 3,389,735 | 6/1968 | Katz | 411/120 |
| 3,428,306 | 2/1969 | Harrison | 269/239 X |
| 3,950,874 | 4/1976 | Diggs | 248/539 X |
| 4,076,158 | 2/1978 | Barr | 248/552 X |
| 4,187,702 | 2/1980 | Benton | 248/552 X |
| 4,308,733 | 1/1982 | Tampa | 248/552 X |

FOREIGN PATENT DOCUMENTS

| | | | |
|---|---|---|---|
| 753086 | 2/1967 | Canada | 411/116 |
| 1397075 | 6/1975 | United Kingdom | 248/228 |

*Primary Examiner*—David M. Purol

*Attorney, Agent, or Firm*—Buchanan Ingersoll; George P. Baier

[57] ABSTRACT

A clamping arrangement for securing end-of-train sensing and monitoring equipment to a railway car coupler and including a plurality of movable gripping arms. A rotatable elongated threaded screw cooperatively associated with the movable gripping arms. The movable gripping arms include insertable portions which fit into core holes formed on the side of the car coupler and which securely grip the sides of the core holes when the gripping arms are closed by the threaded screw.

33 Claims, 3 Drawing Sheets

12 11 6 15 4 3 5a 19a 17 18a 1 41 5b 26 8 18b 42 2 10 7 9

3
25a
5a
5b
21
22
23
24
19a
19
19b
25
20
17
13
14
15
16
18
5d
5c
27
32
30
31
28
39
18a
18b
33
29
34
37
38
36
40
26

CLAMP FOR RAILROAD CAR COUPLER

FIELD OF THE INVENTION

This invention relates to a clamp for securely attaching equipment to a railroad car coupler and, more particularly, to a clamping device having relatively movable arms provided with gripping portions formed on one end for being inserted into core holes on a railroad car coupler and pivoted at the other end on a vertical support shaft which carries end-of-train indicating equipment.

BACKGROUND OF THE INVENTION

The recent removal of cabooses from the end of freight trains has generated a need for equipment which is capable of sensing and monitoring the brake line pressure and which is capable of confirming the presence of the last car. In practice, the equipment includes the electronics, radio transmitter, pressure transducer, and battery which are all housed within an appropriate protective casing. It has been found that the ideal equipment mounting location for the casing is on the open coupler of the last car, since the "glad-hand" of the coupling hose is readily available for measuring the brake line pressure. In addition, the last coupler location is obviously the end-of-train, and the body of the last car provides some protection against the elements and environment. However, the shape and bulkiness of the railroad car couplers makes it difficult to suitably mount the end-of-train equipment casing. Further, the equipment is exposed to the extreme shock and vibrations of the railroading milieu. Moreover, the equipment is repeatedly mounted and removed from the railroad cars and, accordingly, it is necessary to provide a method of quickly and easily attaching and detaching the end-of-train apparatus.

OBJECTS OF THE INVENTION

Accordingly, it is an object of this invention to provide a new and improved clamp for mounting equipment on a railroad car coupler.

Another object of this invention is to provide an improved mounting arrangement for clamping end-of-train apparatus to a car coupler.

A further object of this invention is to provide a novel clamp having movable jaws pivoted about a vertical support shaft and having gripping portions which are opened and closed by turning a threaded rod.

Yet another object of this invention is to provide an adjustable C-shaped clamp for securely attaching equipment to the last coupler of a railroad vehicle.

Yet a further object of this invention is to provide a clamp having a plurality of pivotal curved jaws which are closed by turning an elongated screw for being inserted into core holes in a railroad car coupler.

Still another object of this invention is to provide a clamp for securing apparatus to a railroad car coupler comprising, a plurality of relatively movable members, an elongated screw interconnecting said movable members for opening and closing said movable members, and said movable members including gripping portions which enter core holes formed in the car coupler as said movable members are moved toward their closed positions by turning said screw.

Still a further object of this invention is to provide a mounting arrangement for holding equipment onto a railway car coupler comprising, first means for carrying the equipment, second means being capable of being opened and closed and insertable into core holes formed in the car coupler, and third means for causing the second means to move to a closed position to become securely attached to the car coupler.

SUMMARY OF THE INVENTION

Briefly, in accordance with the present invention, there is provided a mounting arrangement for securing end-of-train monitoring equipment to the car coupler of the last railway vehicle. The mounting arrangement includes a clamping device having a pair of multiple arms which are movable relative to each other between opened and closed positions. The multiple arms include gripping portions which are adapted to fit into core holes formed in the side of the coupler head. The multiple arms are pivotally joined about a vertical support shaft. An elongated threaded screw is cooperatively associated with a pair of revolvable stanchion members which are disposed between each pair of multiple arms. A rotating handle is carried by the elongated threaded screw for opening and closing the multiple jaws. A locking mechanism is padlocked after the clamping device is secured to the coupler head to prevent unauthorized removal of end-of-train equipment.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
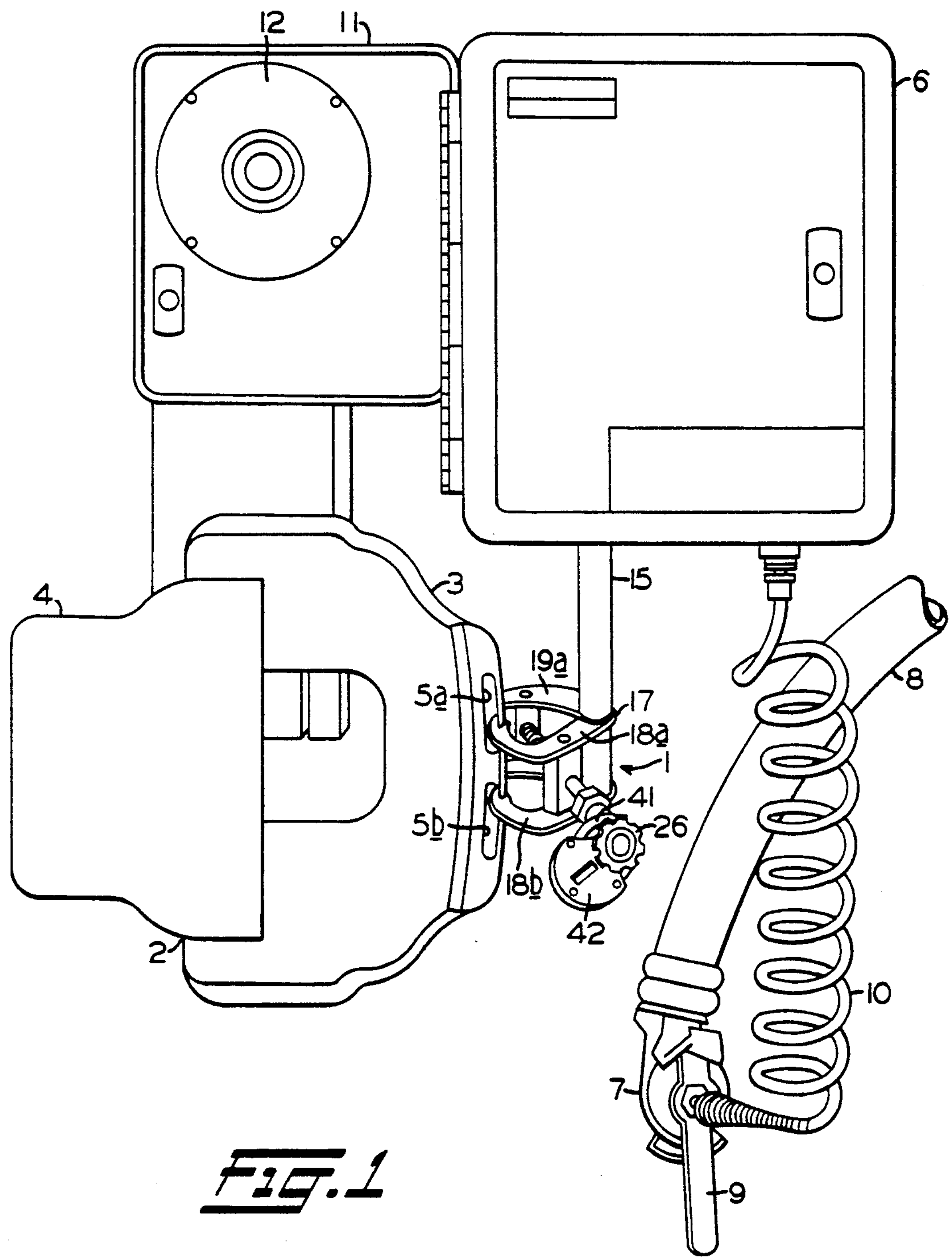
FIG. 1 is a front elevational view of the end-of-train brake pressure sensing and monitoring equipment and clamping device for attachment to the side of the AAR coupler head of the last vehicle of a railway train.
Figure 2:
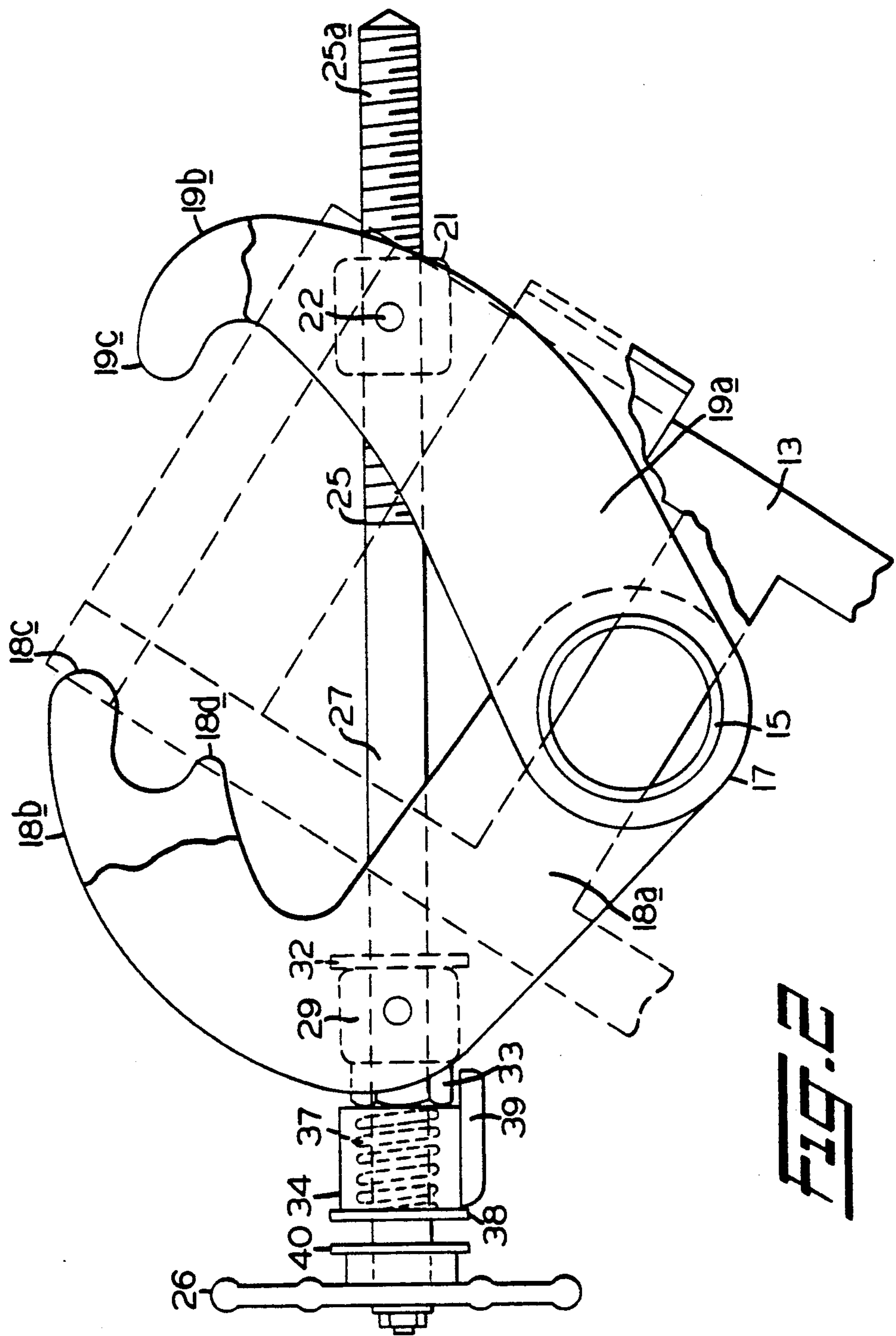
FIG. 2 is an enlarged partial front elevational view showing the details of the clamping device of FIG. 1.
Figure 3:
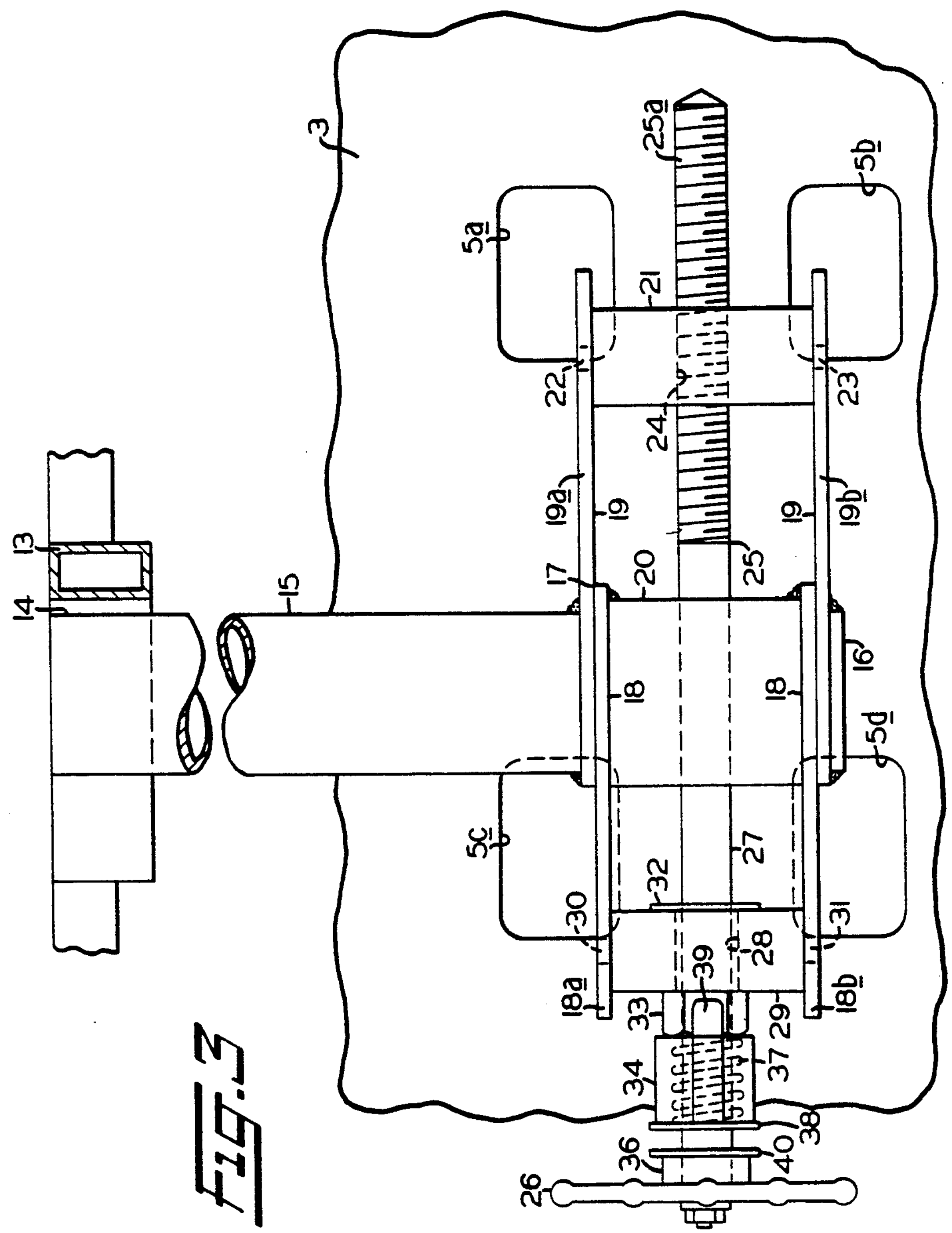
FIG. 3 is a top plan view of the clamping device of FIG. 2.

Referring now to the drawings, and in particular to FIG. 1, there is shown a mounting arrangement generally characterized by numeral 1 for securely attaching the end-of-train equipment of the sensing and monitoring system to the coupler of the last railway car. The last car coupler 2 includes a head portion 3 and a knuckle 4. The head has a downward-extending vertical side in which are formed core holes 5*a*, 5*b*, 5*c* and 5*d*. The core holes are formed during casting to lessen the weight of AAR type "E" and "F" car couplers which are predominately used in the railroad industry. The end-of-train sensing and monitoring equipment includes a main lockable enclosure 6 which contains the electronics, radio transmitter pressure transducer, and battery. The pressure transducer, which measures the end-of-train brake pressure, is connected to the "glad-hand" 7 of the pneumatic hose 8 by a modified dummy "glad-hand" fitting 9 and flexible coil hose 10. An auxiliary lockable flashing marker light package 11 is easily field-mounted and attached to one side of the main enclosure 6. The package 11 includes a red or amber lens 12 and houses a battery-powered incandescent bulb which flashes at a required rate. As shown in FIGS. 2 and 3, the enclosure is carried by a mounting or supporting frame 13 which is fabricated of lightweight rectangular metal tubing. The upper end 14 of an upstanding post or pipe 15 is slotted and is suitably secured to the center of gravity of the supporting frame 13. The lower end 16 of the vertical pipe 15 carries a clamping device 17.

As shown, the clamp 17 includes a pair of upper and lower gripping arms or members 18 and 19. The clamping arm 18 is made up of two substantially identical curved inner jaws 18a and 18b while the clamping arm 19 is made up of two substantially identical outer curved jaws 19a and 19b. As shown in FIG. 2, the upper and lower clamping arms 18a and 18b include a pair of offset gripping tips or tongs, two of which are characterized by numerals 18c and 18d to accommodate either the AAR standard type "E" or "F" couplers. On the other hand, the upper and lower clamping arms 19a and 19b include a single gripping tip or tong, which is characterized by numeral 19c. It will be seen that the non-gripping ends of the two gripping arms 18a and 18b are joined and separated by a spacer sleeve or bushing 20 which is welded to the inner face of the arms. The nongripping ends of the two outer clamping members 19a and 19b receive the lower end of the pipe 15 which also passes through upper inner arm 18a, sleeve 20, and lower inner arm 18b. As shown in FIGS. 1 and 2, a revolvable stanchion or spacer block 21 is disposed between and intermediate the ends of clamping arms 19a and 19b of member 19. The stanchion block 21 pivots about fulcrum points or pins 22 and 23 which fit into appropriate holes formed in the upper and lower arms 19a and 19b. The stanchion block 21 includes a threaded bore 24 for receiving the threaded end portion 25a of an elongated screw-threaded shaft 25 which is provided with a handle or turning means 26 on the other end. It will be seen that the intermediate portion 27 of the elongated shaft 25 is unthreaded and freely passes through a clearance bore 28 formed in a revolvable stanchion or spacer block 29 disposed between the intermediate ends of the clamping arms 18a and 18b. The stanchion block 29 pivots about the fulcrum points or pins 30 and 31 which fit into appropriate holes drilled or punched in the upper and lower clamping arms 18a and 18b, respectively A washer 32 is welded to the inner side of the spacer block 29. A hex nut 33 is welded to the elongated shaft 25 and engages the outer side of the spacer block 29. A slidable twelve (12) point socket 34 is disposed about the elongated shaft 25 and is situated between the hex nut 33 and the hub 36 of the handle 26. As shown in FIGS. 2 and 3, a helical compression spring 37 is disposed within the socket 34 and is caged between hex nut 33 and a flat washer 38 which is welded to the outer side of the socket 34. A locking lug 39 is silver-soldered to the outer side surface of the socket 34 and is biased to its unlocked position, as shown in FIGS. 2 and 3, by spring 37. A flat washer 40 is welded to the inner face of the hub 36. As will be described hereinafter, the gap between washers 38 and 40 is designed to accept a shackle 41 of a padlock 42 to prevent unauthorized opening of the clamp 17 and removal of the end-of-train equipment from the coupler 2 of the last car.

In describing the operation, let us assume that it is desired to place the end-of-train equipment onto the coupler of the last vehicle of a railroad train. First, the clamping jaws are opened by rotating the handle in a counterclockwise direction to cause the screw-threaded portion 25a to retract in bore 24. The handle 26 is continually turned until the jaws are separated sufficiently where the tongs 19c align with core holes 5a and 5b and the tongs 18c and/or 18c, 18d align with core holes 5c and 5d, depending whether the coupler is a type "E" or "F". After placing the respective tong into its matching core hole, the handle is turned in the clockwise direction to cause the closing of the clamping jaws. The screw portion 25a turns in the threaded bore 24 of stanchion 21 and the jaws are drawn or moved toward each other until the gripping tips securely grasp the inner vertical edges of the core holes 5a, 5b, 5c and 5d. After sufficient tightening, the socket member is pushed inwardly against the tension of the spring so that the inner flat surface of the locking lug 39 is adjacent the flat side surface of the stanchion 29. Next, the shackle 41 of the suitable padlock 42 is inserted between flat washers 38 and 40 and is snapped shut to securely lock the clamp 17 in place.

Thus, the end-of-train equipment is easily and quickly clamped to the side of the last car coupler so that the brake line pressure may be continuously monitored and may be transmitted to the cab of the train to keep the trainman informed of the pressure condition and of the presence of the last vehicle of the train. Further, it will be seen that the side clamping arrangement keeps the buffing faces of the head 3 and knuckle 4 clear to allow coupling of a pusher locomotive or another railway car.

It will be understood that various alterations and changes may be made by those skilled in the art without departing from the spirit and scope of the subject invention. Therefore, it will be appreciated that certain modifications, ramifications, and equivalents will be readily apparent to a skilled artisan and, accordingly, it is understood that the present invention is not to be limited to the exact embodiment shown and described but should be afforded the full scope and protection of the appended claims.

Having thus described the invention, what we claim as new and desire to secure by Letters Patent, is:

1. A clamp for securing apparatus a railway car coupler comprising, a plurality of relatively movable members, an elongated screw interconnecting said movable members for opening and closing said movable members, said movable members including at least four separate gripping portions each of which are adapted to enter each one of four cores holes formed in the car coupler as said movable members are moved toward their closed positions by turning said screw, and support means for supporting said apparatus that is to be secured to said railway car coupler, said support means being operably connected to said movable members so that said movable members project from said support means and are insertable into said core holes formed in said car coupler.

2. The clamp, as defined in claim 1, wherein said plurality of said movable members are pivoted about a common shaft.

3. The clamp, as defined in claim 1, wherein said plurality of movable members includes a pair of first pivotal jaws and a pair of second pivotal jaws.

4. The clamp, as defined in claim 3, wherein a pair of stanchions interconnect said pair of first pivotal jaws with said pair of second pivotal jaws.

5. The clamp, as defined in claim 4, wherein each of said pair of stanchions is drilled to receive said screw.

6. The clamp, as defined in claim 3, one of said pair of said first and second pivotal jaws includes a single inwardly-extending tong, and the other of said pair of said first and second pivotal jaws includes two inwardly-extending tongs.

7. The clamp, as defined in claim 1, wherein said portions take the form of inwardly-extending tongs.

8. The clamp, as defined in claim 1, wherein a locking device securely latches said movable members in their closed positions.

9. The clamp, as defined in claim 1, wherein said movable members are horizontally-rotatable about a vertical shaft.

10. The clamp, as defined in claim 1, wherein said elongated screw includes a handle for turning said screw.

11. A mounting arrangement for holding equipment onto a railway car coupler comprising, first means for carrying the equipment, second means capable of being opened and closed and having quadruple free end portions each of which is insertable into a separate one of four core holes formed in the car coupler, third means for causing said second means to move to a closed position to be securely attached to the car coupler, and said first means including support means for supporting said equipment that is to be held onto a railway car coupler, said support means being operably connected to said free end portions so that said free end portions project from said support means and are insertable into said core holes formed in said car coupler.

12. The mounting arrangement, as defined in claim 11, wherein said second means includes clamping jaws for engagement with the core holes.

13. The mounting arrangement, as define din claim 12, wherein said third means includes a threaded rod for opening and closing said clamping jaws.

14. The mounting arrangement, as defined in claim 13, wherein a lock is placed on said threaded rod to secure said second means in said closed position.

15. The mounting arrangement, as defined in claim 11, wherein said second means includes a pair of pivotal members having tongs for being inserted into the core holes.

16. The mounting arrangement, as defined in claim 11, wherein said third means includes an elongated screw having a handle at one end for turning in either direction.

17. The mounting arrangement, as defined in claim 11, wherein said first means includes a support structure for receiving the equipment.

18. The mounting arrangement, as defined in claim 11, wherein said second means includes a plurality of pivotal members having tongs for insertion into the core holes.

19. The mounting arrangement, as defined in claim 18, wherein some of said plurality of pivotal members include at least two tongs for insertion into the core holes of at least two different car couplers.

20. A clamp for attaching equipment to a railroad car coupler comprising, a first pair of gripping jaws disposed in an upper horizontal plane, a second pair of gripping jaws disposed in a lower horizontal plane, a common relative movable interconnection disposed between the horizontal planes of said gripping jaws, a threaded rod interconnecting said first and said second pairs of gripping jaws whereby hook portions of said jaws cooperate with four core holes located on the side of the coupler for secure attachment, and support means for supporting said equipment that is to be attached to a railroad car coupler, said support means operably connected to said first pair of gripping jaws and said second set of gripping jaws so that said first set of gripping jaws and said second set of gripping jaws project from said support means so as to cooperate with said four core holes to secure said equipment to said coupling.

21. A clamp for securing end-of-train apparatus to the last railway car coupler comprising, a first pair of upper clamping arms located in an upper horizontal plane, a second pair of lower clamping arms located in a lower horizontal plane, a common pivot point vertically disposed between the horizontal planes of said first and second pair of said upper and lower clamping arms, a first revolvable stanchion disposed between one of said first pair of said upper clamping arms and one of said second pair of said lower clamping arms, a second revolvable stanchion disposed between the other of said first pair of said upper clamping arms and the other of said second pair of said lower clamping arms, an elongated threaded shaft cooperatively associated with said first and second stanchions for causing relative horizontal movement of said clamping arms, each of which includes a gripping tip located on its free end which is adapted to enter four core holes formed in the coupler when said clamping arms are closed to securely attach the end-of-train apparatus to the coupler, and a locking device cooperatively associated with said elongated threaded shaft to positively lock said clamping arms in their closed position.

22. The clamp, as defined in claim 21, wherein said locking device includes means for accommodating a padlock.

23. The clamp, as defined in claim 22, wherein said means includes a spring-biased socket having a lug which cooperates with a flat surface of a member carried by said elongated threaded shaft.

24. The clamp, as defined in claim 23, wherein said elongated threaded shaft includes a handle having a hub which cooperates with said spring-biased socket to accommodate the shackle of said padlock.

25. A coupler mount assembly for use with a railway vehicle coupler including a side wall having a convex exterior surface that is provided with a first pair of vertically aligned and spaced apart relief holes adjacent the coupler tip and a second pair of vertically aligned and spaced-apart relief holes adjacent the coupler base, said coupler mount assembly being adapted to mount an equipment housing on the coupler and comprising:

first and second jaw means, said first jaw means including upper and lower, parallel hooks whose vertical spacing corresponds to the vertical spacing between the relief holes of the first relief hole pair, said second jaw means including upper and lower, parallel hooks whose vertical spacing corresponds to the vertical spacing between the relief holes of the second relief hole pair;

support means to which the equipment housing may be secured, said support means additionally supporting said first and second jaw means for movement relative to each other and so that the hooks thereof project from said support means and face each other; and, clamping means supported by said support means for drawing said first and second jaw means toward each other, whereby said hooks of said first and second jaw means clamp an intermediate portion of the coupler side wall between the first and second relief hole pairs when said hooks of said first jaw means have been inserted into the first relief hole pair and said hooks of said second jaw means have been inserted into the second relief hole pair.

26. The coupler mount assembly of claim 25, wherein one of said first and second jaw means is stationary relative to said support means and the other of said first and second jaw means is movable relative to said support means.

27. The coupler mount assembly of claim 26, wherein said first jaw means is stationary and said second jaw means is movable.

28. The coupler mount assembly of claim 25, wherein said first and second jaw means each include a body from which said upper and lower, parallel hook integrally project and wherein said bodies are supported by said support means.

29. In combination with the coupler mount assembly of claim 25, a sensor/transmitter unit of a railway brake pressure monitor, said sensor/transmitter unit including a housing secured to said support means and means secured to said housing for coupling said sensor/transmitter unit to the brake pipe of a railway vehicle.

30. The combination of claim 29, wherein said means for coupling comprising a flexible hose secured to said housing and a gladhand connector disposed at the end of said flexible hose.

31. A coupler mount assembly for use with a railway vehicle coupler including a side wall having a convex exterior surface that is provided with a first pair of vertically aligned and spaced-apart relief holes adjacent the coupler tip and a second pair of vertically aligned and spaced-apart relief holes adjacent the coupler base, said coupler mount assembly being adapted to mount an equipment housing on the coupler and comprising:

first and second jaw means, each of which includes a hook;

support means to which the equipment housing may be secured, said support means additionally supporting said first and second jaw means for movement relative to each other and so that the hooks thereof project from said support means and face each other; and, clamping means supported by said support means for drawing said first and second jaw means toward each other, whereby said hooks of said first and second jaw means clamp an intermediate portion of the coupler side wall between the first and second relief hole pairs when said hook of said first jaw means has been inserted into one hole of the first relief hole pair and said hook of said second jaw means has been inserted into a corresponding hole of the second relief hole pair.

32. In combination with the coupler mount assembly of claim 31, a second/transmitter unit of a railway brake pressure monitor, said sensor/transmitter unit including a housing secured to said support means and means secured to said housing for coupling said sensor/transmitter unit to the brake pipe of a railway vehicle.

33. The combination of claim 32, wherein said means for coupling comprising a flexible hose secured to said housing and a gladhand connector disposed at the end of said flexible hose.

* * * * *

UNITED STATES PATENT AND TRADEMARK OFFICE

CERTIFICATE OF CORRECTION

PATENT NO. : 5,131,269

DATED : July 21, 1992

INVENTOR(S) : ROBERT H. BLOSNICK, JAMES M. TOMS

It is certified that error appears in the above-identified patent and that said Letters Patent is hereby corrected as shown below:

Column 2, line 51, after "coupler" insert --2--.

Column 4, line 41, claim 1, after "apparatus" insert --to--.

Column 5, line 32, claim 13, change "define din" to --defined in--.

Signed and Sealed this

Seventh Day of September, 1993

Attest:

BRUCE LEHMAN

Attesting Officer

*Commissioner of Patents and Trademarks*